(12) United States Patent
Moriyama et al.

(10) Patent No.: US 6,524,374 B2
(45) Date of Patent: Feb. 25, 2003

(54) CANISTER

(75) Inventors: Masatoshi Moriyama, Ohbu (JP); Toshio Yoshida, Ohbu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 23 days.

(21) Appl. No.: 09/851,390

(22) Filed: May 9, 2001

(65) Prior Publication Data
US 2001/0039881 A1 Nov. 15, 2001

(30) Foreign Application Priority Data
May 15, 2000 (JP) ........................................ 2000-141112

(51) Int. Cl.[7] .............................................. B01D 53/02
(52) U.S. Cl. ............................ 96/131; 96/135; 96/139; 96/143; 96/152; 123/519
(58) Field of Search .................. 123/519; 55/385.3; 96/130, 131, 134, 135, 139, 140, 141, 143, 144, 147, 149, 152

(56) References Cited

U.S. PATENT DOCUMENTS

| 3,730,158 | A | * | 5/1973 | St. Amand |
| 4,306,894 | A | * | 12/1981 | Fukami et al. |
| 4,381,929 | A | * | 5/1983 | Mizuno et al. |
| 4,386,947 | A | * | 6/1983 | Mizuno et al. |
| 4,448,594 | A | * | 5/1984 | Kozawa |
| 5,538,542 | A | * | 7/1996 | Watanabe et al. |
| 5,538,543 | A | * | 7/1996 | Watanabe et al. |
| 5,645,036 | A | * | 7/1997 | Matsumoto et al. |
| 5,851,268 | A | * | 12/1998 | Hyodo et al. |
| 5,914,457 | A | * | 6/1999 | Itakura et al. |
| 2001/0015134 | A1 | * | 8/2001 | Uchino et al. |
| 2001/0020418 | A1 | * | 9/2001 | Yamafuji et al. |
| 2001/0039881 | A1 | * | 11/2001 | Moriyama et al. |

FOREIGN PATENT DOCUMENTS

| JP | 6-249088 | 9/1994 |
| JP | 8-189428 | 7/1996 |

* cited by examiner

Primary Examiner—Duane S. Smith
(74) Attorney, Agent, or Firm—Stevens, Davis, Miller & Mosher, LLP

(57) ABSTRACT

In order to aim at shortening the time of refueling by maintaining the function of prevention of discharge of vapor, similar to that of a conventional canister in the case of other than refueling during resting of an engine while the flow resistance in the canister becomes smaller during refueling, there is provided a canister in which a plate is vertically arranged in a chamber charged therein with absorbent in the canister, and filter support pins are projected from opposite surfaces of the plate while filters are arranged at the tip end faces of the filter support pins, and in which a plurality of constriction passages are formed being arranged in a horizontal direction only in the upper part of the plate.

6 Claims, 6 Drawing Sheets

CANISTER

BACKGROUND OF THE INVENTION

The present invention relates to a canister located in an evaporated fuel processing device.

RELATED ART

Conventionally, as a canister which is located in an evaporated fuel processing device for preventing evaporated fuel (vapor) in a fuel tank on an automobile from leaking into the atmosphere, there has been proposed a canister of such a type that copes with an ORVR (Onboard Refueling Vapor Recovery) regulation, in which a plate is arranged in a absorbent charging chamber of the canister, and a constriction passage is formed in the plate in order to trap and process vapor in the fuel tank, in particular during refueling, without the vapor leaking into the atmosphere. This canister is disclosed in, for example, JP-A-06-249088 and JP-A-08-189428.

In such an ORVR regulation type canister, a conventional structure of the canister in which the above-mentioned plate is vertically arranged is shown in FIGS. 4 to 6.

The canister 1 shown in FIGS. 4 to 6, is composed of a main chamber 3 in which absorbent 2 including active carbon is charged, and a subchamber 4 in which the absorbent 2 is charged, and further, the subchamber 4 is partitioned into a first subchamber 4a and a second subchamber 4b by a plate 5 having constriction passages. The main chamber 3 and the first subchamber 4a are communicated with each other through a diffusion chamber 6.

The main chamber 3 and the subchamber 4 are arranged in a horizontal direction, and the plate 5 is arranged in a vertical direction.

A vapor introduction port 7 for sucking vapor (gasoline vapor) generated in a fuel tank during refueling, and a purge port 8 communicated with an air intake part of an engine are provided to the main chamber 3 on the side remote from the diffusion chamber 6. Further, there are shown absorbent holding filters 9, 10, an absorbent holding plate 11, and an absorbent holding spring 12.

An absorbent holding filter 13, an absorbent holding plate 14 and an absorbent holding spring 15 are provided in the first subchamber 4a on the diffusion chamber 6 side.

An atmospheric port 16 opened to the atmosphere is provided to the second subchamber 4b on the side remote from the plate 5. Reference 17 in the figures denotes an absorbent holding filter 17.

Several filter support pins 18 are projected from opposite surfaces of the plate 5, as arranged in FIG. 6. Filters 19, 20 for the plate are arranged at tip end faces of the filter support pins 18 on both surfaces of the plate, and the absorbent 2 is held by these filters 19, 20 while communication passages 21, 22 are defined between adjacent filter support pins 18. A constriction passage 23 which is a circular through-hole as shown in FIGS. 5 and 6 is formed in the plate 5, being located in its center upper part.

With this arrangement, at a time other than refueling, during resting of an engine, when liquid fuel in the fuel tank is evaporated so that the internal pressure becomes higher than a predetermined value, vapor in the fuel tank is introduced through the vapor introduction port 7 into the main chamber 3 in the canister 1, and the fuel component thereof is trapped by the absorbent 2. Then, the vapor has been introduced into the first subchamber 4a from the diffusion chamber 6 and a fuel component which has not yet trapped in the main chamber 3 is absorbed by the absorbent 2 in the first subchamber 4a. Further, the vapor passes through the filter 19 and ascends flowing through the communication passages 21 between the filter support pins 18 and between the plate 5 and the filter 19, and thereafter, passes through the constriction passage 23. Further, the vapor passes through the communication passages 22 and the filter 20, and enters into the second subchamber 4b in which a fuel component is trapped by the absorbent 2 in the second subchamber 4b. The vapor which is purified, substantially similar to the air after the fuel component is trapped, passes through the filter 17, and is vented into the atmosphere from the atmospheric port 16.

In such a case that is other than refueling, since the constriction passage 23 is formed at a position in the upper part of the plate 5, the vapor comes up from the lower side to the upper side as indicated by the arrows shown in FIG. 6, and the stream of the vapor is restrained and further, the discharge of the vapor from the atmospheric port 16 is restrained by the constriction passage 23.

Further, during refueling, the vapor whose pressure becomes higher in the fuel tank than that obtained in the case other than refueling, is introduced into the main chamber 3 from the vapor introduction port 7 due to its high positive pressure. The thus introduced vapor flows through the canister 1 so that the fuel component is trapped in the absorbent 2 in the chambers, similarly to above, and accordingly, the vapor having substantially become a purified gas which is similar to the air is vented into the atmosphere from the atmospheric port 16.

By the way, the volume of the vapor flowing into the canister 1 during refueling, is extremely large in comparison with that obtained in the case of other than refueling when the engine is rested. Accordingly, the air flow resistance among the filter support pins 18 of the plate 5 becomes higher during refueling. Therefore, if the flow distance among the filter support pins 18 is long, and if the flow resistance of the constriction passage 23 is high, the function of preventing the vapor from being discharged into the atmosphere become higher in the case of other than refueling, but the refueling speed becomes lower than usual so that the time of refueling is longer. On the contrary, if the above-mentioned passage resistance becomes lower in order to shorten the time of refueling, vapor which contains a fuel components by a large quantity is discharged into the atmosphere in the case of other than refueling. Accordingly, it is difficult that enhancing the prevention of discharge of vapor is consistent with the shortening of the time of refueling.

As the conventional plate 5 shown in FIG. 6, in the one in which a single constriction passage 23 is formed in the center upper part thereof, vapor which has flown into the first subchamber 4a from the diffusion chamber 6 comes up from the lower side to the upper side as indicated by the arrows in FIG. 6, and in particular, the vapor which flows on the opposite sides as indicated by the arrows $A_1$, $A_2$ has a long flowing distance to the constriction passage 23, and accordingly, it is difficult to shorten the time of refueling.

SUMMARY OF THE INVENTION

Accordingly, an object of the present invention is, as comparative with the conventional canister with the plate shown in FIG. 6, to provide a canister which can maintain the discharge of vapor into the atmosphere in the case of other than refueling, similar to the conventional canister 5, and further, which can aim at shortening the time of refueling.

To the end, according to the present invention, there is provided a canister which introduces vapor generated in a fuel tank thereinto through a vapor introduction port and then causes the vapor to flow through a chamber charged therein with an absorbent so as to purify the vapor, substantially similar to the air before it is vented from an atmospheric port, and in which a plate is vertically arranged in the chamber charged therein with the absorbent, the plate being formed in its upper part with a constriction passage means and being formed on its opposite surfaces with filter support pins having tip end faces at which filters are arranged, wherein the constriction passage means is composed of a plurality of constriction passages which are arranged in a horizontal direction only in the upper part of the plate.

According to the present invention, during refueling, the volume and the pressure of vapor introduced into the canister are higher than that in the case of other than refueling, and the influence of the flow resistance of the vapor flowing among the filter support pins is high. With this arrangement, since the constriction passage means is composed of a plurality of constriction flow passages which are arranged in a horizontal direction, the flowing distance from the lower part of the plate to the constriction passage means becomes shorter, in average, than that of the conventional canister in which a single conventional constriction passage is formed in the upper part of the plate, and accordingly, the flow resistance (pressure loss) among the filter support pins 18 becomes smaller. Thus, the time of refueling can be shortened in comparison with the conventional one having a single constriction passage.

Further, in the case of other than refueling when the engine is rested, the volume and the pressure of vapor introduced into the canister are smaller than those during refueling. Accordingly, the influence of the flow resistance among the filter support pins is less, and therefore, the function of preventing discharge of vapor can be maintained, similar to the conventional one having a single constriction passage.

Further, in the present invention, the inner diameter of each of the plurality of constriction passages may be set to be equal to or smaller than a distance between adjacent those of the filter support pins.

Further, in the present invention, the relationship between the inner diameter D of each of the plurality of constriction passages and the distance L between adjacent those of the filter support pins may be set in a manner that L/D is in a range from 1 to 3.

With this arrangement, the influence of the flow resistance by the filter support pins can be further reduced, and the time of fueling can be effectively shortened.

Moreover, in the present invention, the plurality of constriction passages are composed of those having a larger diameter and those having a smaller diameter.

With this arrangement, technical effects similar to those as mentioned above can be exhibited, and the freedom of design can be enhanced in the case of less space in the horizontal direction of the plate.

In the above arrangement in which the constriction passages are composed of those having a larger diameter and those having a smaller diameter, the inner diameter of those having a smaller diameter may be set to be equal to or smaller than the distance between adjacent those of the filter support pins.

In the arrangement in which the constriction passages are composed of those having a larger diameter and those having a smaller diameter, the relationship between the inner diameter D of those having a smaller diameter and the distance between adjacent those of the filter support pins is set in a manner that L/D is in a range from 1 to 3.

Even with these arrangements, technical effects and advantages similar to that as mentioned above can be exhibited.

DESCRIPTION OF PREFERRED EMBODIMENTS

Explanation will be made of embodiments according to the present invention with reference to FIGS. 1 to 3.

Figure 4:
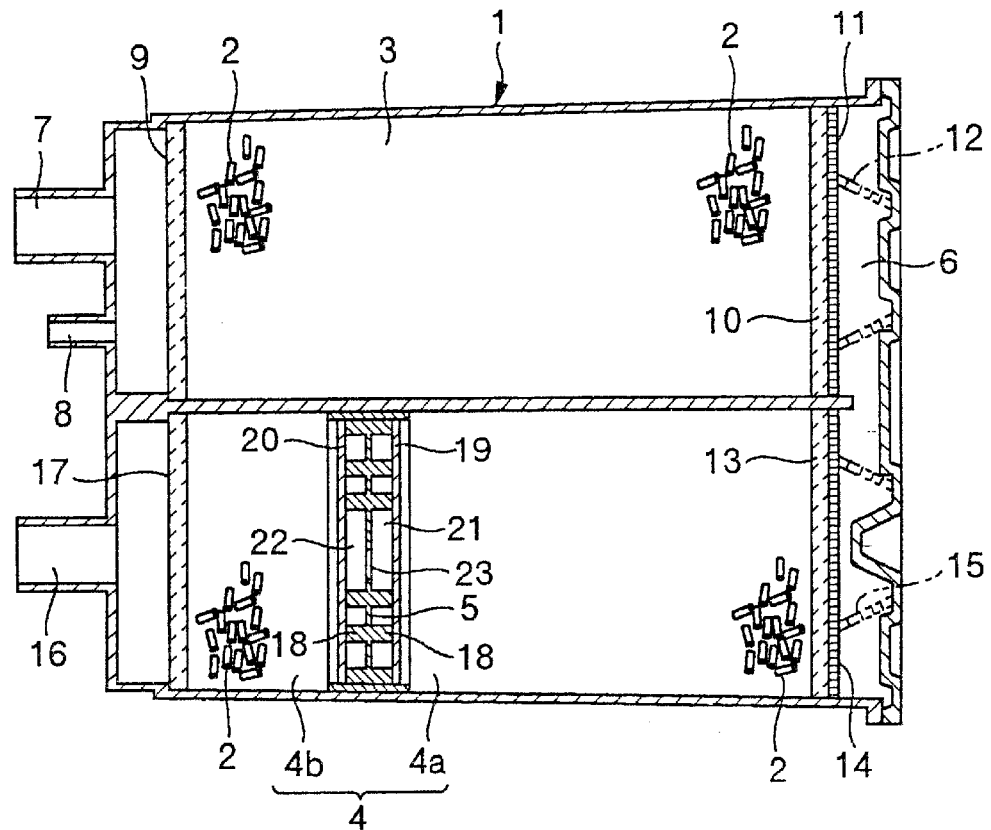
FIG. 4 is a plan view illustrating a conventional canister.
Figure 5:
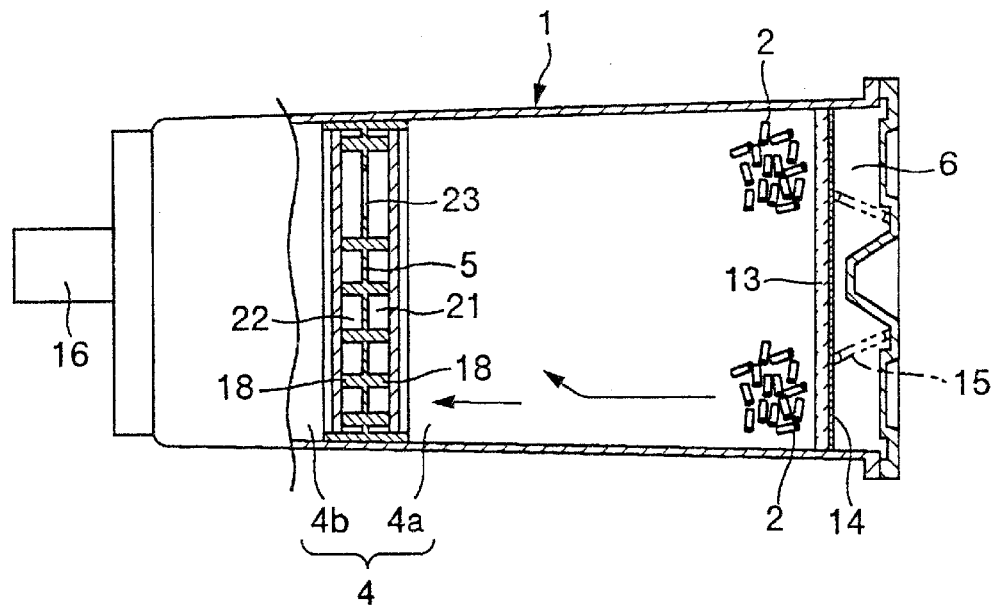
FIG. 5 is a side view of the canister in FIG. 4.
Figure 6:
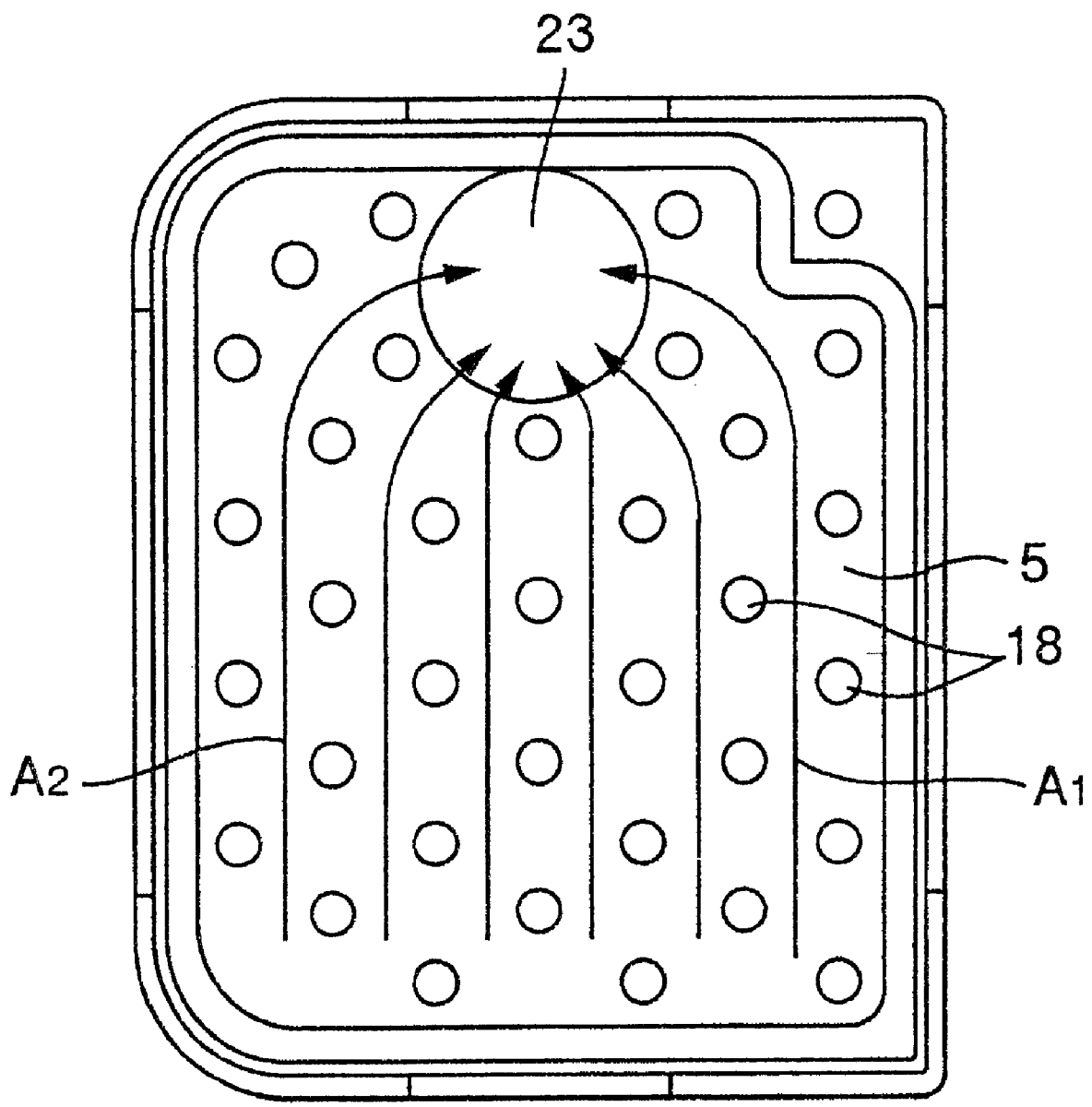
FIG. 6 is a front view illustrating a conventional plate.

The construction according to the present invention is the same as that of the conventional one shown in FIGS. 4 to 6, with only exception such that the structure of a plate 5 is different. Accordingly, like reference numerals are used to denote parts like to those shown in FIGS. 4 and 5 except the structure of the plate 30 according to the present invention, and explanation thereto will be omitted.

Figure 2A:
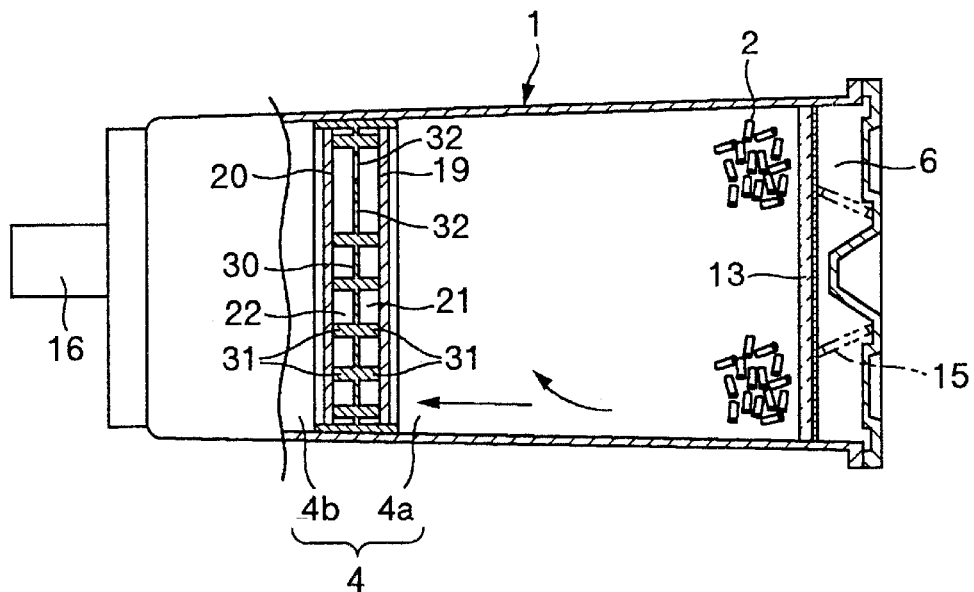
FIG. 2A is a side sectional view of the canister in FIG. 1.
Figure 2B:
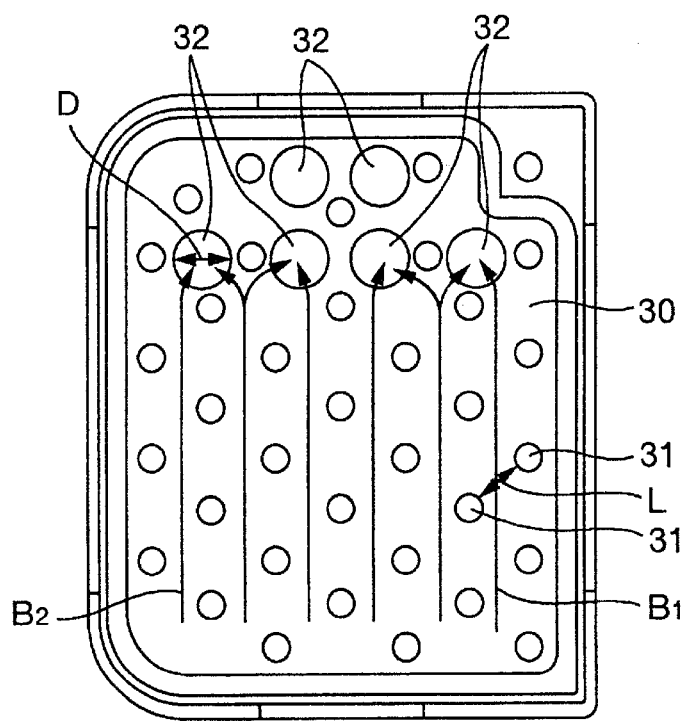
FIG. 2B is a front view illustrating a plate in the first embodiment of FIG. 1.

A plurality of filter support pins 31 similar to the conventional those are projected from both surfaces of a plate 30 located vertically in a subchamber 4, similar to the conventional filter support pins, having a predetermined distance (space) L, as shown in FIG. 2B.

Further, as constriction passage means, a plurality of constriction passages 32 are formed, piecing through the upper part of the plate 30, among the filter support pins as shown in FIG. 2B. In the embodiment shown in FIG. 2B, two constriction passages 32 are formed in a horizontal direction at the upper stage in the upper part of the plate 30, and four constriction passages are formed in a horizontal direction at the lower stage in the upper part of the plate.

The constriction passages 32 all have the same diameter D which is set to be equal to or smaller than the distance L between adjacent those of the filter support pins 31. The relationship between D and L is desirably set so that L/D is in a range from 1 to 3. Further, the total of opening areas of the plurality of constriction passages 32 is set to be larger than the flow area of the vapor introduction port 7.

Figure 1:
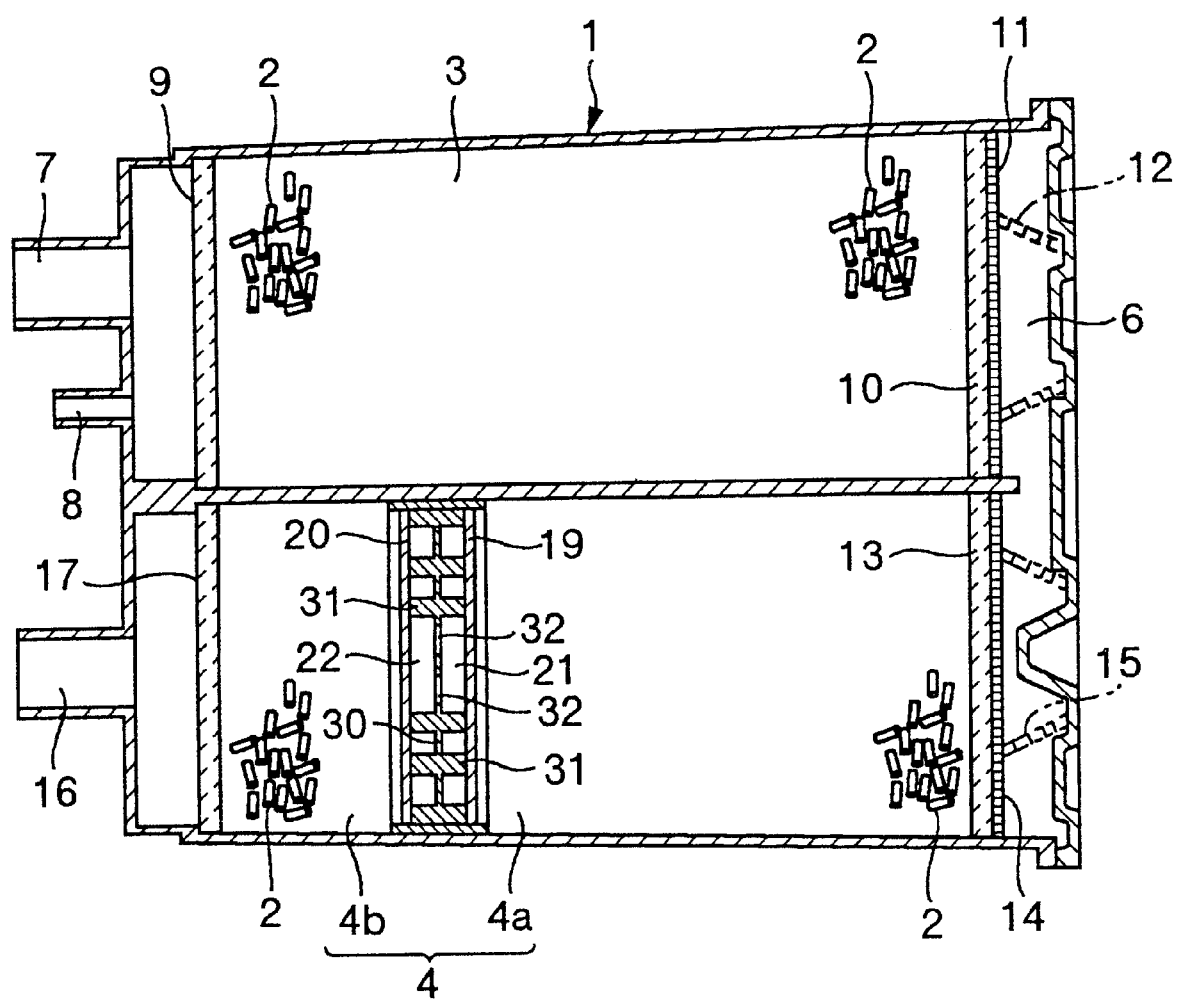
FIG. 1 is a plan sectional view illustrating a canister in a first embodiment according to the present invention.

In the plate of the first embodiment in FIG. 1, as shown in FIG. 2B, the distance L between adjacent those of the filter support pins 31 is set to 8 mm, and the inner diameter D of each constriction passage 32 is set to 8 mm. Further, the six constriction passages are formed so that the total opening area of these six constriction passages is set to be equal to that of the conventional single constriction passage 23 having a diameter 20 mm as shown in FIG. 6.

Figure 3:
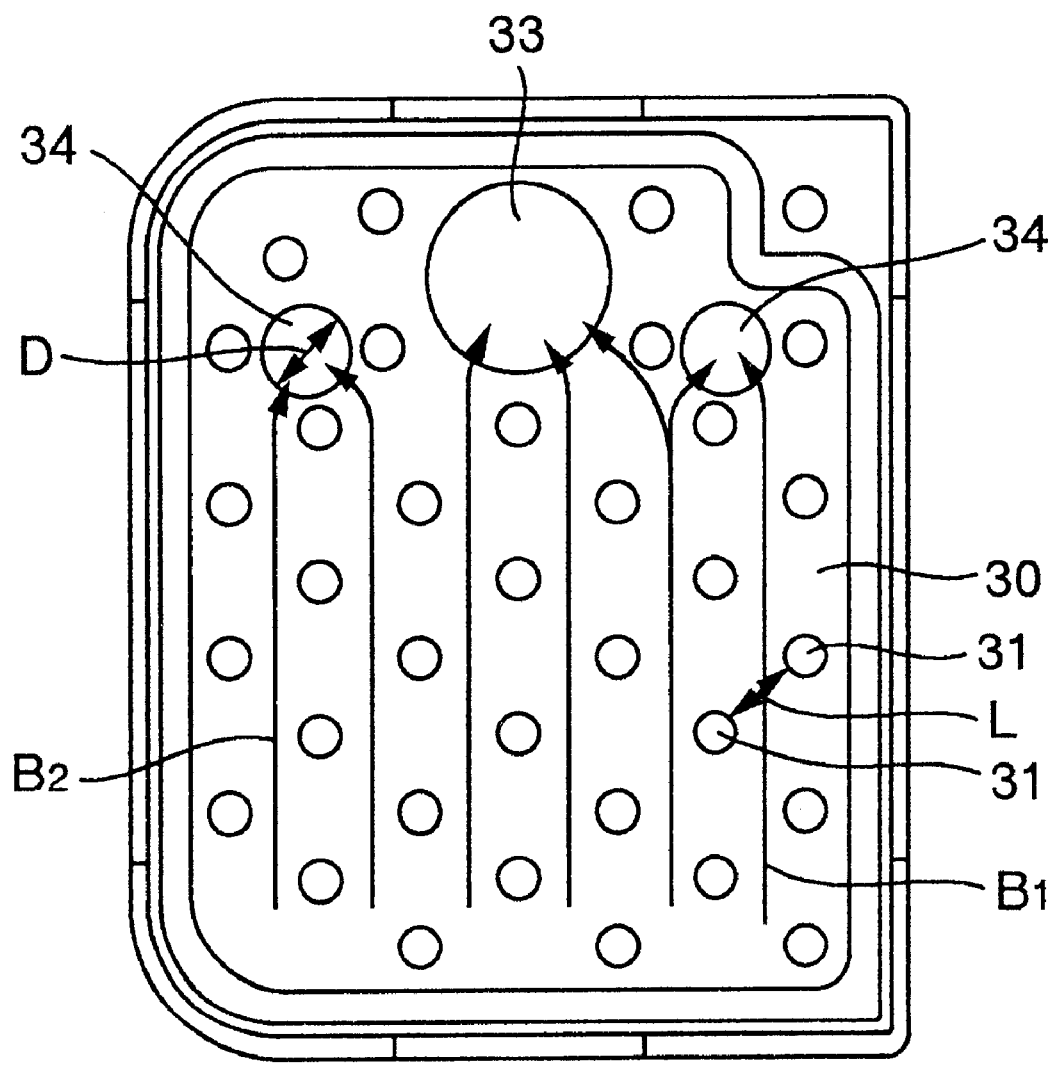
FIG. 3 is a front view illustrating a modified embodiment of a plate corresponding to the plate in FIG. 2B.

Instead of the above-mentioned constriction passages 32, a large diameter constriction passage 33 and small diameter constriction passages 34 may be formed in the upper part of the plate 30 as in a modified embodiment shown in FIG. 3. In the case of forming such large and small diameter constriction passages 33, 34, the inner diameter D of the small diameter constriction passage 34 is set so as to obtain the relationship that L/D is in a range from 1 to 3. In the modified embodiment shown in FIG. 3, two of the small diameter constriction passages 34 having an inner diameter of 8 mm are formed being located on opposite sides in the upper part of the plate 30, and a single large diameter constriction passage 33 having an inner diameter of 16.5 mm is formed in the center upper part of the plate 30. The total area of these three constriction passages 33, 34 is set to be equal to the area of the conventional single constriction passage 23 having a diameter of 20 mm shown in FIG. 6.

As mentioned above, in the case of other than refueling during resting of an engine, when vapor in the fuel tank is introduced into the first subchamber 4a in the canister 1 from the vapor introduction port 7 through the main chamber 3 and the diffusion chamber 6, the vapor ascends passing through the flow spaces 21 among the filter support pins 31 from the lower part of the first subchamber, and then flows into the second subchamber 4b through the constriction passages 32 or 33 and 34 formed in the upper part of the plate 30. At this time, the volume and the pressure of the vapor are less than those during the refueling, and accordingly, the influence of the flow resistance among the filter support pins 31 and through the constriction passages 32, 33, 34 are small, similar to that of the conventional one shown in FIG. 6. Thus, the function of prevention of discharge of vapor into the atmosphere in the case of other than refueling can be maintained, similar to the conventional one.

Further, even during refueling, the vapor ascends passing through the flow spaces 21 among the filter support pins 31 from the lower part of the first subchamber 4a, similar to the case of other than refueling. At this time, since the volume and the pressure of the vapor are greater than those in the above-mentioned case of other than refueling, the influence of the flow resistance by the filter support pins is large. However, since the plurality of constriction passages 32, 33, 34 are formed in the upper part of the plate 30, being located in a horizontal direction, the vapor flows as indicated by the arrows in FIGS. 2B and 3, and then flows into the constriction passages 32, 33, 34, and accordingly, the flowing distances from the lower part of the plate 30 to the constriction passages 32, 33, 34, in particular, the distances in the horizontal direction, which are indicated by the arrows $B_1$, $B_2$ become shorter than those in the conventional structure shown in FIG. 6. Accordingly, the influence of the flow resistance by the filter support pins 31, that is, the pressure loss can be smaller than that shown in FIG. 6 due to the shorter distance thereof. Thus, the time of refueling can becomes shorter than that of the conventional canister shown in FIGS. 4 to 6.

Further, of the plurality of constriction passages 32, 33, 34, at least one constriction passage 32 or 34 has an inner diameter D which set to be equal to or smaller than the distance L between adjacent those of the filter support pins 31, and accordingly, the influence of the flow resistance by the filter support pins 31 in passages through which the vapor flows into the constriction passages 32, 34 can be substantially negligible. Accordingly, also in view of this fact, it is possible to shorten the time of refueling.

Figure 7:
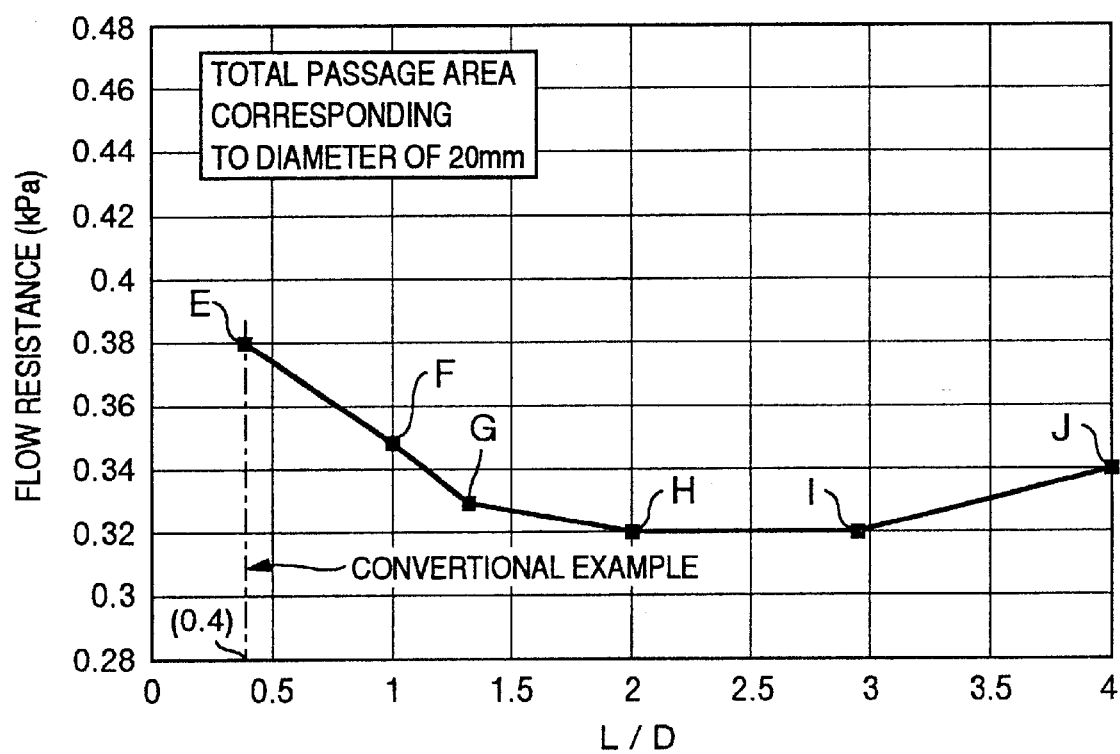
FIG. 7 is a view illustrating a flow resistance due to the relationship between a distance L between adjacent those of filter pins, and the inner diameter D of a constriction passage.

FIG. 7 shows a characteristic as a result of experiments for measuring the flow resistance with respect to the relationship between the inner diameter D of the constriction passages and the distance L between adjacent those of the filter support pins 31.

In this case, the measured flow rate was set to 45 liters/min similar to the time of refueling, and the total area of the constriction passages was set to that of the constriction passage having an inner diameter 20 mm while the distance L between adjacent those of the filer support pins 31 was set to 8 mm. Further, the flow resistance was measured by a monometer between the vapor introduction port 7 and the atmospheric port 16. It is noted that resin pellets having a particle size of about 2 mm were used, instead of the absorbent 2 for the sake of convenience for the experiments.

Referring to FIG. 7, in the case of the conventional one having a single constriction passage having a diameter D=20 mm (L/D=0.4), the flow resistance becomes about 0.38 kPa at a point E, while in the case of the first embodiment, as shown in FIG. 2B, having six constriction passages with a diameter of 8 mm (L/D=1), the flow resistance becomes about 0.35 kPa at a point F, and further, in the case of an embodiment having eleven constriction passages with a diameter of 6 mm (L/D=1.33), the flow resistance becomes about 0.33 kPa at a point G, while in the case of an embodiment having twenty five constriction passages with a diameter of 4 mm (L/D=2), the flow resistance becomes about 0.32 kPa at a point H.

Further, in the case of an embodiment having fifty five constriction passages with a diameter 2.7 mm (L/D=2.96), the flow resistance becomes about 0.32 kPa at point I, and in the case of an embodiment having one hundred constriction passages with diameter of 2 mm (L/D=4), the flow passage becomes 0.34 kPa at a point J. However, the construction passages having a large number from 55 to 100 is not practical since it is difficult that a large number of constriction passages should be formed only in the upper part of the plate.

Further, if L/D exceeds 3, the flow rate coefficient of each constriction passage starts increasing.

In view of the above-mentioned results, it is preferable to set L/D in a range from 1 to 3.

Further, as shown in FIG. 3, in the case of forming a plurality of constriction passages having large and small diameters, as shown in FIG. 3, namely, in such a case that only one large diameter constriction passage 33 having a diameter which is set to 16.5 mm is provided while two small diameter constriction passages having a diameter which is set to 8 mm are provided, since one of the small diameter constriction passages exhibits L/D=1, the flow resistance becomes about 0.35 kPa at a point F in FIG. 7.

As mentioned above, according to the present invention, the function of prevention of discharge of vapor in the case of other than refueling during resting of an engine, can be maintained similar to that of a conventional one while the time of refueling can be shortened in comparison with that of the conventional one.

Further, by setting the inner diameters of a plurality of constriction passages to a value in relation to the distance between adjacent those of the filter support pins, the time of refueling can be effectively shortened.

Further, if the inner diameters of all constriction passages are set to be equal to or smaller than the distance between adjacent those of the filter support pins, the design of a canister can be made in view of the diameters of the constriction passages, irrespective of a number and sizes of the filter support pins, thereby it is possible to facilitate the design thereof.

What is claimed is:

1. A canister in which vapor generated in a fuel tank is introduced through a vapor introduction port and flows through a chamber charged with absorbent so as to be purified, substantially similar to air, and then the vapor is discharged from an atmosphere, comprising a plate arranged vertically in the chamber charged with the absorbent, and a constriction passage means formed in an upper part of the plate while filter support pins are projected from opposite surfaces of the plate, having tip end faces at which filters are arranged, wherein said constriction passage means is composed of a plurality of constriction passages which are formed being arranged in a horizontal direction only in the upper part of the plate.

2. A canister as set forth in claim 1, wherein said plurality of constriction passages have inner diameters which are set to be equal to or smaller than a distance between adjacent those of the filter support pins.

3. A canister as set forth in claim 1, wherein the inner diameter D of said plurality of constriction passages and the distance L between adjacent those of said filter support pins have a relationship which L/D is set to be in a range from 1 to 3.

4. A canister as set forth in claim 1, wherein said plurality of constriction passages are composed of those having a large diameter and those having a small diameter.

5. A canister as set forth in claim 4, wherein the inner diameter of the constriction passages having a small diamter is set to be equal to or smaller than the distance between adjacent those of said filter support pins.

6. A canister as set forth in claim 4, wherein the inner diameter D of the small diameter constriction passages and the distance L between adjacent those of said filter support pins have a relationship that L/D is set to be in a range from 1 to 3.

* * * * *